US008844805B2

(12) United States Patent
Yokote

(10) Patent No.: US 8,844,805 B2
(45) Date of Patent: Sep. 30, 2014

(54) MEDIUM PROCESSING APPARATUS

(75) Inventor: Takamoto Yokote, Gunma (JP)

(73) Assignee: Oki Electric Industry Co., Ltd., Tokyo (JP)

(*) Notice: Subject to any disclaimer, the term of this patent is extended or adjusted under 35 U.S.C. 154(b) by 156 days.

(21) Appl. No.: 13/473,576

(22) Filed: May 16, 2012

(65) Prior Publication Data

US 2012/0313493 A1 Dec. 13, 2012

(30) Foreign Application Priority Data

Jun. 10, 2011 (JP) ................................ 2011-129857

(51) Int. Cl.

*G06Q 40/00* (2012.01)
*G07D 11/00* (2006.01)
*G07F 19/00* (2006.01)
*B65H 29/00* (2006.01)

(52) U.S. Cl.

CPC .... *B65H 29/006* (2013.01); *B65H 2301/41912* (2013.01); *G07D 11/0006* (2013.01)
USPC .......................................................... 235/379

(58) Field of Classification Search

CPC ........ B65H 3/34; B65H 3/44; B65H 2301/00; B65H 2301/41912; B65H 29/00; B65H 29/006; B65H 5/06; B65H 5/062; G07F 19/00; G07F 19/20; G07F 19/201; G07F 19/204; G07F 19/205; G07F 19/2055
USPC .................. 235/379; 271/216, 225; 242/324; 700/215; 194/350
See application file for complete search history.

(56) References Cited

U.S. PATENT DOCUMENTS 5,449,165 A * 9/1995 Naramore ..................... 271/225
2004/0232217 A1* 11/2004 Graef et al. ................... 235/379
2010/0021218 A1* 1/2010 Watanabe et al. ............. 399/361

FOREIGN PATENT DOCUMENTS

JP 2011-002921 A 1/2011

OTHER PUBLICATIONS www4.ipdl.inpit.go.jp, Translation for JP2011-002921A.*

* cited by examiner

*Primary Examiner* — Thien T Mai
(74) *Attorney, Agent, or Firm* — Rabin & Berdo, P.C.

(57) ABSTRACT

A medium processing apparatus comprises a casing surrounded by a partitioning wall with an opening; a reel on which tape is wound; a fold-back section provided on an opposite side of the medium processing apparatus to the reel, so as to folded back the tape pulled out from the reel; a drum in the casing to be rotatable such that a rectangular shaped medium fed in the casing is wound onto the drum together with the tape that has been folded back on itself by the fold-back section; a winding guide provided further to a drum side than the tape, the winding guide closes off an internal space of the casing from the outside and presses the tape and the medium against a peripheral face of the drum; and an opening and closing section configuring a portion of the winding guide and opening or closing off the internal space.

7 Claims, 8 Drawing Sheets

MEDIUM PROCESSING APPARATUS

CROSS-REFERENCE TO RELATED APPLICATION

This application claims priority under 35 USC 119 from Japanese Patent Application No. 2011-129857 filed on Jun. 10, 2011, the disclosure of which is incorporated by reference herein.

BACKGROUND OF THE INVENTION

1. Technical Field

The present invention relates to a medium processing apparatus applied, for example, to an automated teller machine (ATM) for performing a desired transaction with an inserted medium such as money.

2. Related Art

Related automated teller machines used at, for example, financial institutions are configured for example to accept money, such as cash in banknotes or coins from a customer, or to pay cash out to a customer according to the contents of a transaction with the customer.

As described in Japanese Patent Application Laid-Open (JP-A) No. 2011-2921, automated teller machines are proposed that include a banknote input-output port that accepts banknotes from a customer, a differentiation section that determines the denomination and authenticity of inserted banknotes, a temporary storage section that temporarily stores inserted banknotes, and denomination specific cassettes that store banknotes according to their denomination.

With such automated teller machines, when a customer has inserted banknotes into the banknote input-output port during a deposit transaction, the inserted banknotes are differentiated by the differentiation section, and banknotes determined to be authentic are stored in the temporary storage section. However, banknotes determined to be unsuitable for a transaction are returned to the banknote input-output port and given back to the customer.

When the deposit amount has been confirmed by the customer, the differentiation section then rechecks the denomination of the banknotes that have been temporarily stored in the temporary storage section, and the banknotes are stored in the denomination specific cassette corresponding to the differentiated denomination.

As illustrated by for example FIG. 10 of JP-A 2011-2921, a related temporary storage section 100 is configured to store a large number of banknotes BL by pinching the banknotes BL between an upper tape 33 and a lower tape 36, aligned along the short side direction, preventing the banknotes BL from for example creasing up with a movable guide 101 while winding them consecutively onto a cylindrical drum 31.

The temporary storage section 100 is also configured to bring out the stored banknotes BL by rotating the drum 31 in the opposite direction to the direction during storing whilst the upper tape 33 and the lower tape 36 are wound onto respective reels, not shown in the drawings.

SUMMARY

Depending on factors such as the condition of the banknotes, some of the banknotes BL may be damaged when wound onto the drum 31 in the temporary storage section 100. Fragments of the damaged banknotes BL (referred to below as torn notes BX) can accumulate for example in a gap between a temporary storage section casing 30 and the drum 31.

Removal operations to remove internally accumulated torn notes BX are therefore performed on the temporary storage section 100 during maintenance by an operative. During removal operations, if an operator was able to open a movable guide 101 towards the outside (namely, towards the top side in the diagram), the operator would easily be able to see the interior of the temporary storage section 100, and easily be able to remove the torn notes BX.

However, due to the structure of the temporary storage section 100, since the upper tape 33 runs above the top of the movable guide 101, it is only possible to open the temporary storage section as far as a position (shown by dotted lines 101X in the diagram) at which the movable guide 101, having a center of rotation around a movable axis 45, makes contact with the upper tape 33.

There is consequently difficulty of operation in removal operations at the temporary storage section 100, as the operator has to peer into the interior through a tiny gap between the temporary storage section casing 30 and the movable guide 101 in order to see and remove the torn notes BX.

In consideration of the above circumstances, a subject of the present invention is to provide a medium processing apparatus obtaining a marked increase in ease of operation.

In order to address the above issues, a medium processing apparatus of one aspect of the present invention includes: a casing configuring an internal space surrounded by a partitioning wall with an opening formed in the casing where there is no partitioning wall present; a reel on which tape is wound, with the tape width narrower than a long side of a rectangular shaped medium; a fold-back section provided on an opposite side of the medium processing apparatus to the reel with the opening disposed between the reel and the fold-back section, such that the tape pulled out from the reel passes across the opening and is folded back by the fold-back section; a drum formed in a circular cylindrical shape provided in the internal space so as to be rotatable with respect to the casing, such that the medium fed in from outside the casing in landscape orientation is wound onto the drum together with the tape that has been folded back on itself by the fold-back section; a winding guide provided further to a drum side than the tape spanning across between the reel and the fold-back section, such that the winding guide closes off the internal space from the outside of the casing and presses the tape and the medium against a peripheral face of the drum; and an opening and closing section configuring a portion of the winding guide and opening the internal space to the outside of the casing or closing off the internal space from outside of the casing.

In the above aspect, a medium can be accordingly appropriately wound while being pressed against the drum by the winding guide when the opening and closing plates of the winding guide are closed off. However, fingers and tools for example can be easily inserted inside the casing when the opening and closing plates of the winding guide have been opened.

The present invention can therefore achieve a medium processing apparatus that obtains a marked increase in efficient operation.

BRIEF DESCRIPTION OF THE DRAWINGS

Exemplary embodiments of the present invention will be described in detail based on the following figures, wherein.

DETAILED DESCRIPTION OF THE INVENTION

Detailed explanation follows regarding exemplary embodiments of the present invention, with reference to the drawings.

1. Automated Teller Machine Overall Configuration

Figure 1:
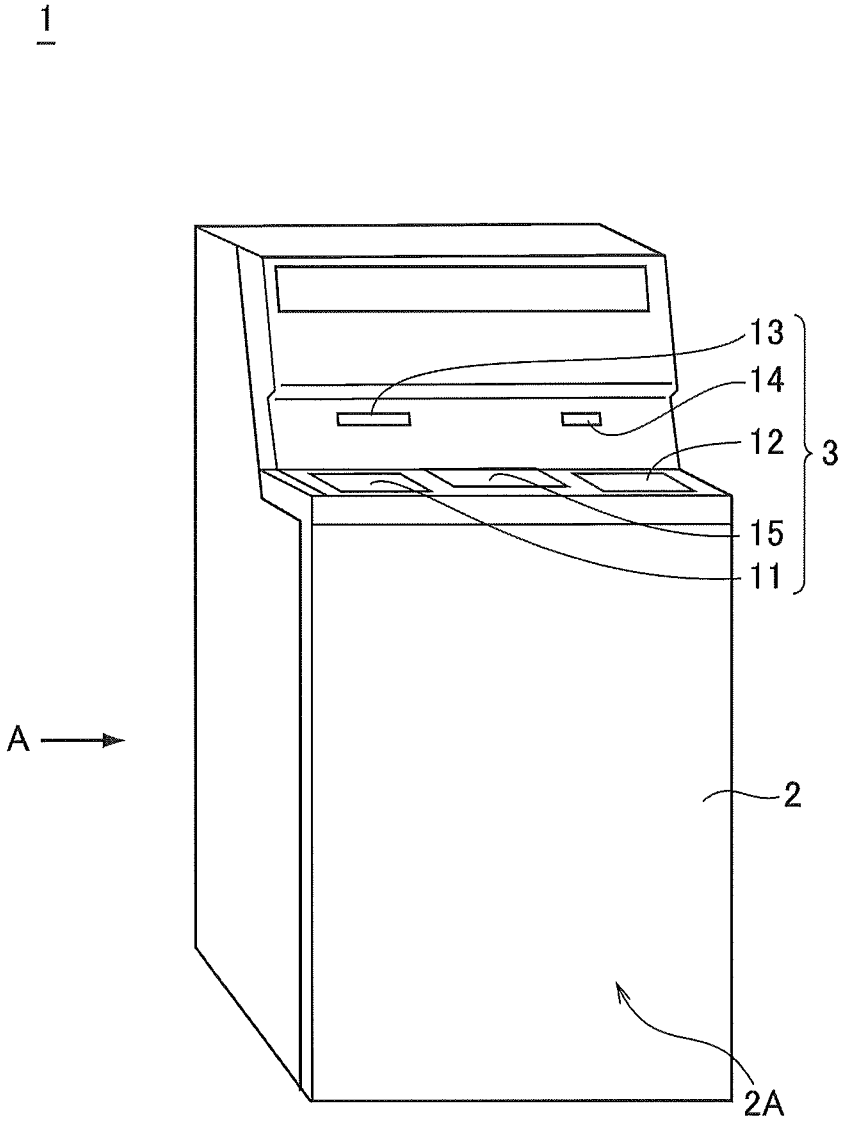
FIG. 1 is an outline perspective view illustrating an external configuration of an automated teller machine.

As illustrated in external view in FIG. 1, an automated teller machine 1 is configured in a boxed shaped casing 2 and performs transactions related to cash with a customer.

A customer interface section 3 is provided in a location on a front face 2A side spanning from an upper portion of the front face 2A to the top face of the casing 2, such that a facing customer can easily perform such operations as inserting banknotes and operating a touch panel.

The customer interface section 3 is employed for performing direct transactions with a customer such as with money or passbooks, and for notifying a customer of transaction related information and receiving transaction related operation instructions from a customer. The customer interface section 3 includes a coin input-output port 11, a banknote input-output port 12, a passbook input-output port 13, a card input-output port 14 and a display and operation section 15.

The coin input-output port 11 and the banknote input-output port 12 are ports into which a customer respectively inserts coins or banknotes to be deposited and for respectively discharging coins or banknotes to be dispensed to a customer. The coin input-output port 11 and the banknote input-output port 12 are configured so as to be opened or closed by driving respectively provided shutters. Note that since banknotes are generally configured from rectangular shaped paper, sometimes the banknotes handled have been bent or folded by circulation.

In a transaction, a passbook is inserted into and discharged from the passbook input-output port 13 when the transaction has been completed. A passbook processing section (not shown in the drawings) is provided in a back section of the passbook input-output port 13 for recording such items as transaction contents on the passbook.

The card input-output port 14 is a section where various cards such as cash cards are inserted into and discharged from. A card processing section (not shown in the drawings) is provided in a back section of the card input-output port 14 for reading data magnetically stored on each type of card, such as account numbers.

The display and operation section 15 includes a Liquid Crystal Display (LCD) and a touch panel which are integrated to each other, the LCD displays an operation screen during transactions and the touch panel is for selecting various transactions and inputting data such as PINs and transaction amounts.

Figure 2:
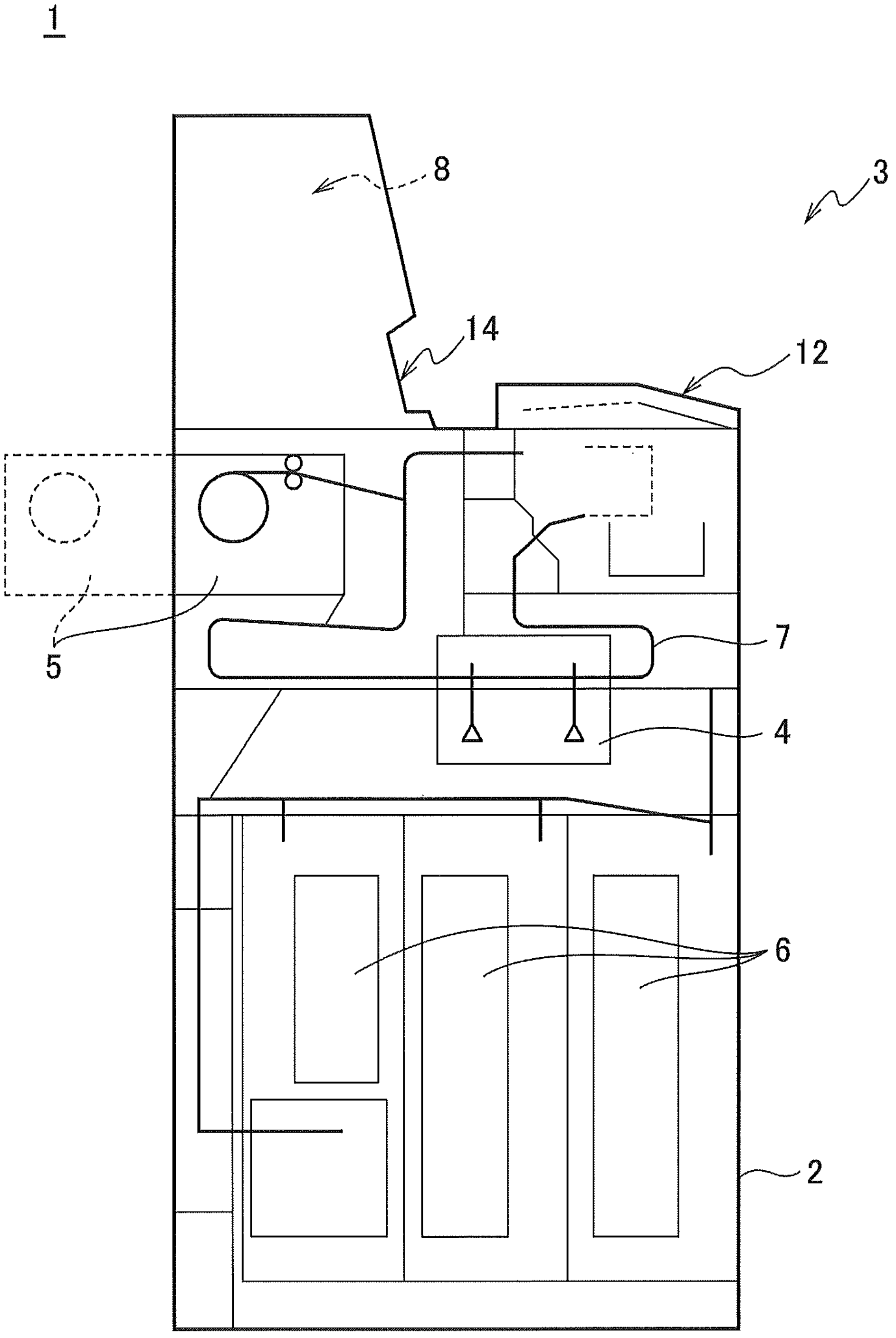
FIG. 2 is an outline drawing illustrating an internal configuration of an automated teller machine.

FIG. 2 is a side view of the automated teller machine 1 of FIG. 1, as viewed along the arrow A direction. FIG. 2 mainly illustrates portions of the internal configuration of the automated teller machine 1 relating to banknote processing. As shown in FIG. 2, the customer interface section 3 is provided at the top inside the automated teller machine 1, then a differentiation section 4 for determining the denomination and authenticity of banknotes and a temporary storage section 5 for temporarily storing input banknotes are provided, and a banknote storage section 6 equipped with denomination specific cassettes is provided at the bottom inside the automated teller machine 1. A conveying path 7 illustrated with a bold line in FIG. 2 conveys banknotes between each section in landscape orientation of a banknote, in other word, the banknotes are conveyed as banknote short sides are put along conveying direction.

The automated teller machine 1 is controlled overall by a controller 8. When, for example, a customer performs a deposit transaction, after receiving a specific operational input through the display and operation section 15, the controller 8 causes the shutter of the banknote input-output port 12 to open to let banknotes be inserted.

The controller 8 then makes the inserted banknotes be conveyed along the conveying path 7 to the differentiation section 4, be performed differentiation, and banknotes determined to be authentic banknotes further be conveyed to the temporary storage section 5. However, reject banknotes determined not to be suitable for a transaction are conveyed back to the banknote input-output port 12 for returning to the customer.

The controller 8 then arranges the deposit amount to be confirmed by the customer through the display and operation section 15 and the banknotes being temporarily held in the temporary storage section 5 to be conveyed back again to the differentiation section 4. The denomination is then rechecked, and the banknotes are conveyed to each cassette of the banknote storage section 6 corresponding to the differentiated denomination.

A portion of the side face on the opposite side of the casing 2 to the front face 2A side (namely on the back face side) is configured with a door capable of opening or closing. During transaction operation periods of time, when transactions related to cash are performed with a customer, the banknotes stored inside the banknote storage section 6 are protected by closing each of the doors, as shown in FIG. 1 and FIG. 2. However during an operative performs maintenance operation, operations in each of the internal sections are facilitated by opening each of the doors of the casing 2 as required.

The automated teller machine 1 is configured such that during maintenance operation times, after opening the door on the back face, the temporary storage section 5 can be pulled out towards the back face (as shown by the intermittent lines in FIG. 2) using a specific sliding mechanism, and the top face of the temporary storage section 5 can be tilted towards the back face direction.

2. Temporary Storage Section Configuration

Figure 3:
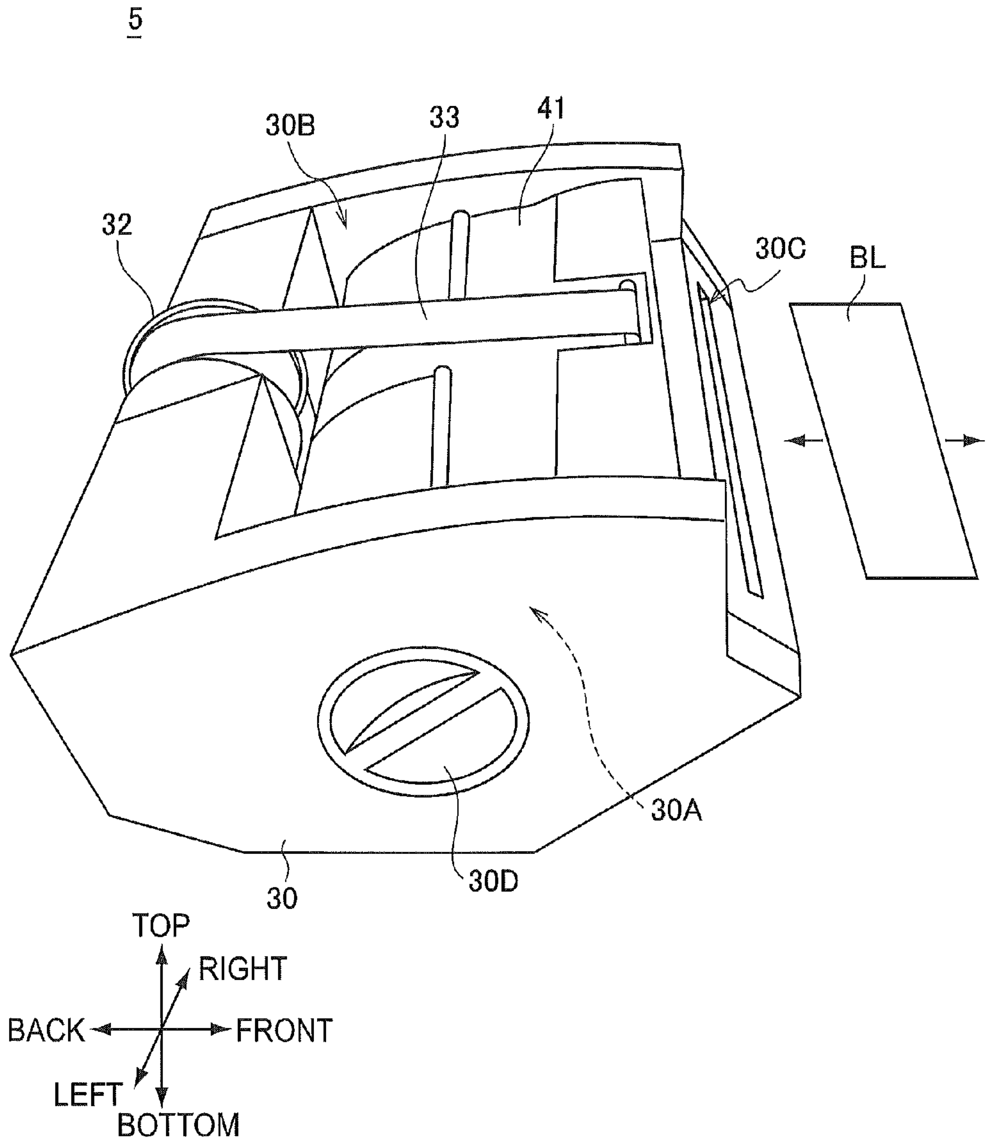
FIG. 3 is an outline perspective view illustrating an external configuration of a temporary storage section.

As shown in FIG. 3, the temporary storage section 5 is configured with each component assembled in a temporary storage section casing 30.

A partitioning wall configures a large part of the external periphery of the temporary storage section casing 30 on the front side that is on the front face 2A (FIG. 1) side when installed in the automated teller machine 1, on the opposite rear side, and on the left and right sides, positioned on the left and right as viewed by a customer facing the front face 2A side, and on the bottom side. An internal space 30A is thus formed surrounded by the partitioning wall. The temporary storage section casing 30 can, however, be accessed from the outside through an opening 30B where the partitioning wall is omitted on the top side of the external periphery.

A banknote input-output hole 30C pierces through the front-face side of the temporary storage section casing 30 and acts as an input-output port for banknotes BL into and out from the internal space 30A.

Components such as gears are installed inside the partitioning wall on the left and right sides of the temporary storage section casing 30 for transmitting dive force from a motor, not shown in the drawings, to drums and rollers that are described later. An operation knob 30D is provided on the left hand side face of the temporary storage section casing 30 for manually rotating drums and rollers when performing maintenance.

Figure 4:
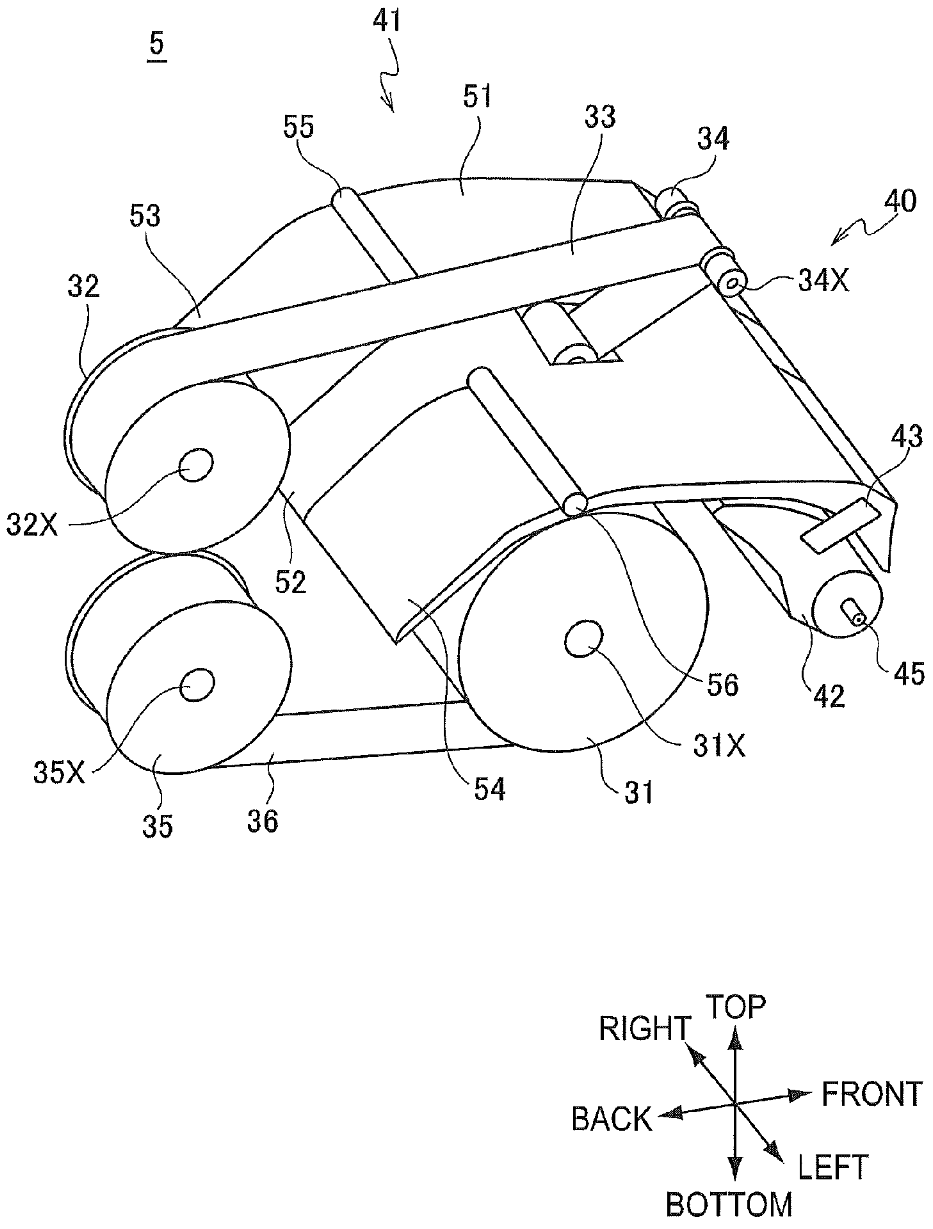
FIG. 4 is an outline perspective view illustrating a temporary storage section internal configuration (1)
Figure 5:
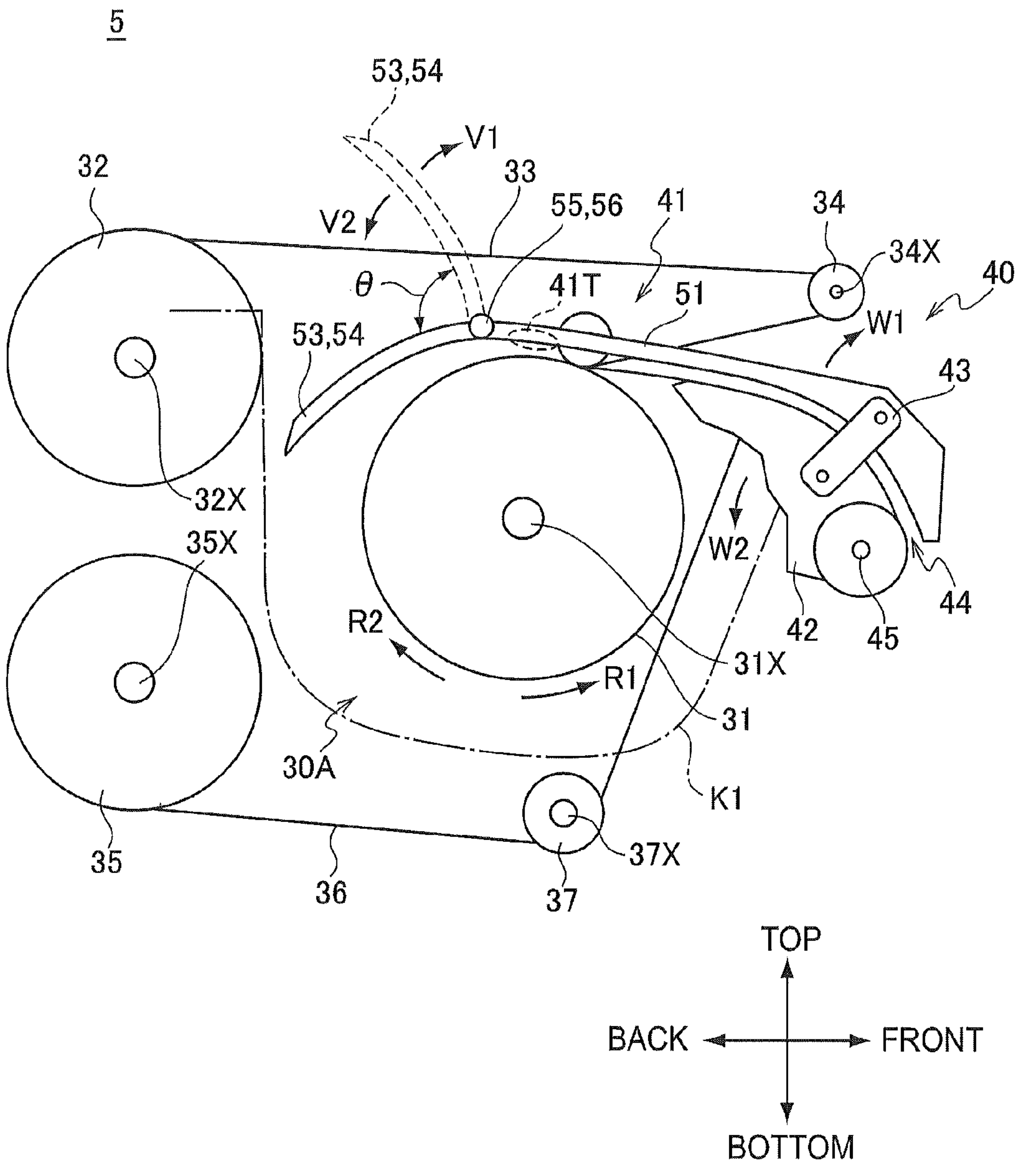
FIG. 5 is an outline drawing illustrating a temporary storage section internal configuration (2)

FIG. 4 is a perspective view of the temporary storage section 5 in which the temporary storage section casing 30 is omitted so as to illustrate each of the components assembled in the temporary storage section casing 30. FIG. 5 is a side view of the temporary storage section 5 of FIG. 4, seen from the left hand side. The single-dash intermittent line K1 in FIG. 5 illustrates a portion of the internal face of the temporary storage section casing 30.

As shown in FIG. 4 and FIG. 5, a drum 31 formed in a circular cylindrical shape is attached inside the internal space 30A (FIG. 3) of the temporary storage section casing 30 so as to be rotatable in a winding-in direction R1 or a winding-out direction R2 about a rotation axis 31X running along the left-right direction.

An upper reel 32 formed in a thread-spool shape is disposed at a location at the rear and towards the top side of the drum 31, namely on the opening 30B (FIG. 3) side. The upper reel 32 is provided so as to rotate about a rotation axis 32X parallel to the rotation axis 31X of the drum 31. An upper tape 33 is wound on the upper reel 32.

An upper guide roller 34 is provided further to the front side than the drum 31 as viewed from the upper reel 32, namely on the banknote input-output hole 30C (FIG. 3) side. The upper guide roller 34 is provided so as to rotate about a rotation axis 34X parallel to the rotation axis 31X of the drum 31.

The upper tape 33 is formed from a thin film of resin, and the tape width is substantially narrower than the long length of the banknotes BL (FIG. 3). The upper tape 33 has sufficient length in the length direction of the upper tape 33.

The upper tape 33 pulled out from the upper reel 32 passes across the opening 30B (FIG. 3) towards the front, and then folds back on itself towards the rear by winding around the upper guide roller 34. The upper tape 33 is pressed against the drum 31 by a specific roller provided to a movable section 40, described later, and the leading end portion of the upper tape 33 is fixed to the drum 31.

The upper reel 32 is provided in the temporary storage section 5 at a position further towards the rear than the drum 31. Interference between the upper reel 32 and other mechanisms in the automated teller machine 1 is avoided by running the upper tape 33 between the upper reel 32 and the upper guide roller 34, and a specific tension is applied to the upper tape 33.

A lower reel 35 is formed similarly to the upper reel 32 in a thread reel shape at a location at the rear and below the upper reel 32, namely towards the lower side of the drum 31. The lower reel 35 is provided so as to be rotatable about a rotation axis 35X parallel to the rotation axis 31X. A lower tape 36 similarly configured to the upper tape 33 is wound as a second tape on the lower reel 35.

A lower roller 37 (FIG. 5) is provided in front of the lower reel 35 so as to be rotatable about a rotation axis 37X parallel to the rotation axis 31X of the drum 31.

The lower tape 36 pulled out from the lower reel 35 passes towards the front and then changes direction upwards due to being wrapped around the lower roller 37. The lower tape 36 then also changes direction so as to extend towards the rear and is pressed against the drum 31 due to the specific roller provided at the movable section 40. The leading end portion of the lower tape 36 is fixed to the drum 31.

In the temporary storage section 5, the lower reel 35 is also, similarly to the upper reel 32, provided at a position to the rear of the drum 31 such that interference between the lower reel 35 and other mechanisms inside the automated teller machine 1 is avoided and a specific tension is applied to the lower tape 36.

The leading end portion of the lower tape 36 is fixed to the outer peripheral face of the drum 31 at a substantially left-right direction central position. The leading end of the upper tape 33 is fixed to the outer peripheral face of the drum 31 so as to be superimposed on the outer peripheral side of the lower tape 36.

When the drum 31 is rotated in the winding-in direction R1 in the temporary storage section 5, the lower tape 36 and the upper tape 33 are wound up so as to be superimposed on each other on the outer peripheral face of the drum 31. In the temporary storage section 5, if there are banknotes BL present between the lower tape 36 and the upper tape 33 when this occurs then the banknotes BL can be wound onto the peripheral face of the drum 31 together with the lower tape 36 and the upper tape 33. Only the long-side direction central portions of the banknotes BL are pressed by the upper tape 33 against the peripheral face of the drum 31.

The movable section 40 is configured including a movable guide 41 on the top side and a facing portion 42 on the bottom side, coupled together into a single unit by a coupling portion 43. A conveying path 44 is configured by the gap between the movable guide 41 and the facing portion 42 and across along at the bottom face side of the movable guide 41.

The movable guide 41 is configured overall as a plate that is shaped so as to curve around to jut downwards at front and rear portions of the movable guide 41. The movable guide 41 is configured by assembling together plural components, as described later.

In the conveying path 44, the upper tape 33 is running on the upper side and the lower tape 36 is running on the lower side.

The movable section 40 thereby conveys banknotes BL inserted through the banknote input-output hole 30C of the temporary storage section casing 30 along the conveying path 44, so that the banknotes BL arrive in the vicinity of the outer peripheral face of the drum 31 in a state nipped from the top and bottom by the upper tape 33 and the lower tape 36.

The movable section 40 is positioned with respect to the temporary storage section casing 30 (FIG. 3) so as to cover the internal space 30A from above the drum 31, namely is attached along a movable axis 45 in a position so as to close off the opening 30B.

The movable axis 45 is a rotation axis running along the left-right direction which renders the movable section 40 rotatable as a whole about a rotation axis parallel to the rotation axis 31X of the drum 31. The movable section 40 is thereby capable of opening and closing rotation actions with respect to the temporary storage section casing 30 in an opening direction W1 and a closing direction W2 about the movable axis 45. The movable section 40 is configured such that the rotation range of the movable section 40 in the opening direction W1 is restricted thereby preventing contact between the movable guide 41 and the upper tape 33.

In practice, the force of gravity acts on the movable section 40 in the closing direction W2, placing a contact portion 41T at the bottom side of the movable guide 41 in contact with the peripheral face of the drum 31. Accordingly, when the drum 31 rotates, the movable guide 41 can guide the banknotes BL which might be bent or folded in a state in which only long-side direction central portions of the banknotes BL are held by the upper tape 33 and the lower tape 36, so as to press the banknotes BL against the outer peripheral face of the drum 31 while smoothing the banknotes BL out along the long-side direction of the banknote.

The outer diameter of the drum 31 appears to increase as a greater number of the banknotes BL are successively wound on the drum 31. In response, the movable section 40 swings about the movable axis 45 in the opening direction W1 such that the movable guide 41 is gradually raised upwards by the drum 31.

As a result, the movable section 40 can always maintain the contact portion 41T on the bottom side of the movable guide 41 in contact with the drum 31, so as to guide the conveying direction and conveying destination of the banknotes BL along the outer peripheral face of the drum 31.

In the temporary storage section 5, the outer diameter of the drum 31, the gap between the drum 31 and the temporary storage section casing 30, and the lengths of the upper tape 33 and the lower tape 36 are each optimized such that about 200 notes of the banknotes BL can be progressively wound onto the drum 31. Additionally, the movable section 40 is configured such that as the outer diameter of the drum 31 changes, the movable guide 41 always contacts the drum 31 in the range of the contact portion 41T.

Figure 6:
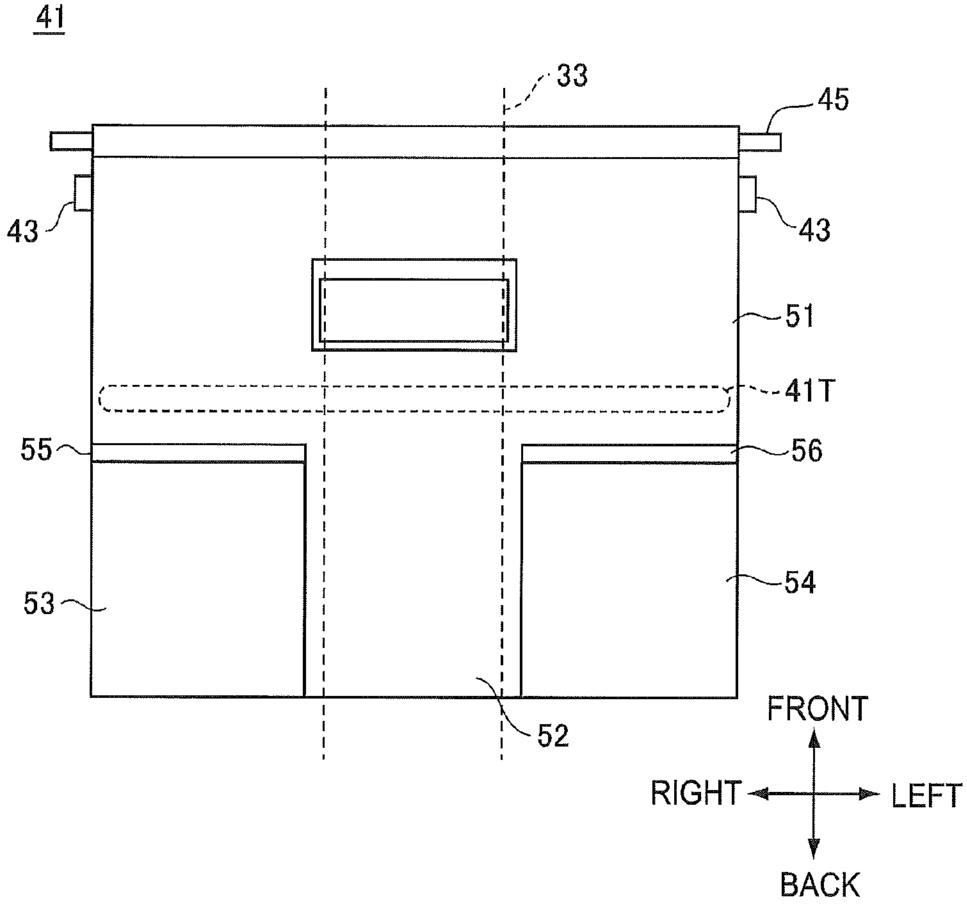
FIG. 6 is an outline drawing illustrating a movable guide configuration.

The movable guide 41 is, as shown in plan view (viewed from above) in FIG. 6, is divided into a base plate 51 configuring a portion at the front side of the movable guide 41, a central section 52 configuring the portion directly below the upper tape 33 in the rear side portion of the movable guide 41, and opening and closing plates 53 and 54 at the right hand side and left hand side of the central section 52.

The base plate 51 is, as shown in FIG. 4 and FIG. 5, configured overall in a plate shape curving downwards at the front side. The banknotes BL are accordingly conveyed from the front to the back along the bottom face of the base plate 51 so as to trace out a curved plane. A through hole is provided in the vicinity of a central portion of the base plate 51 so as to let the upper tape 33 pass through from the top face side to the back-face side.

The central section 52 and the opening and closing plates 53 and 54 are each formed by a thin plate shaped so as to curve along the front-rear direction, with a length that is about ⅓ the length of the movable guide 41 in the front-rear direction.

The central section 52 is fixed to the rear side of the base plate 51, and is integrated to the base plate 51 so as to depict a T-shape (FIG. 6) as viewed from above.

The opening and closing plates 53 and 54 are attached to the base plate 51 through swing shafts 55 and 56 running along the left-right direction. The opening and closing plates 53 and 54 are able to swing with respect to the base plate 51 about the respective swing shafts 55 and 56 in an opening direction V1 or a closing direction V2 within a range of angle θ (FIG. 5). Angle θ is for example a large angle of 90° or greater.

The swing shafts 55 and 56 are assembled with internal springs (not shown in the drawings) such that the opening and closing plates 53 and 54 are biased in the closing direction V2.

Hence, as shown by the solid lines in FIG. 5, the opening and closing plates 53 and 54 are held in a closing off state above the internal space 30A (referred to below as a closed state) when no external force is acting on the opening and closing plates 53 and 54, covering the drum 31.

However when an operator performing a maintenance operation applies external force in the opening direction V1, the opening and closing plates 53 and 54 swing in the opening direction V1, as shown by the broken lines in FIG. 5, such that a partially opened state is formed above the internal space 30A (referred to below as an open state). The operator is accordingly able to access the inside of the internal space 30A from outside, namely able to perform specific operations by easily inserting fingers or tools inside whilst being able to see inside with good visibility.

The opening and closing plates 53 and 54 are positioned so as not to overlap the contact portion 41T to the drum 31, namely at positions further to the rear than the contact portion 41T.

External force upwards (in the opening direction W1) applied to the movable guide 41 by contact with the drum 31 is accordingly not imparted to the opening and closing plates 53 and 54 and is only imparted to the base plate 51.

The opening and closing plates 53 and 54 are thereby able to open or close at the rear side of the base plate 51 around the swing shafts 55 and 56, without interfering with the upper tape 33.

3. Operation and Advantageous Effects

In the temporary storage section 5 of the automated teller machine 1 configured as described above, the movable guide 41 makes contact with the outer peripheral face of the drum 31 in a closed state of the opening and closing plates 53 and 54 during transaction operations related to cash are being performed with a customer.

When some banknotes BL are wound on the drum 31 in order to be temporarily stored in the temporary storage section 5, the movable guide 41 adjusts the base plate 51, the central section 52 and the opening and closing plates 53 and 54 as a single unit so as to conform to the profile of the outer peripheral face of the drum 31 (namely a curved surface profile) and so as to press the banknotes BL against the outer peripheral face.

Therefore even if the banknotes BL is readily bend or fold in the long-side direction due for example to pre-existing creases, the temporary storage section 5 can use the movable guide 41 to wind the banknotes BL onto the drum 31 while smoothing out the banknotes BL along the long-side direction.

However when maintenance is performed by an operator, the operator swings the opening and closing plates 53 and 54 so as to lift them up in the opening direction V1 (FIG. 5), and the temporary storage section 5 adopts an open state. In the temporary storage section 5, the internal space 30A can accordingly be directly viewed from the outside and fingers or tools can be easily inserted through openings made by the opening and closing plates 53 and 54 which have been opened in the movable guide 41.

As a result, when for example fragments of the banknotes BL (torn notes) accumulate in the temporary storage section 5 in the gap between the internal wall K1 (FIG. 5) of the temporary storage section casing 30 and the drum 31, since such fragments can be easily extracted by the fingers or tools of the operator, significantly improved ease of work can be achieved during maintenance operations, enabling maintenance operations to be completed efficiently in a short period of time.

The temporary storage section 5 is configured so as to open and close the opening and closing plates 53 and 54 that are shorter in the front-rear direction than the movable guide 41 without opening and closing the whole of the movable guide 41.

Since the temporary storage section 5 is thereby able to suppress to a minimum the space required for opening and closing of the opening and closing plates 53 and 54, interference with other peripheral components during opening and closing can be avoided and opening and closing can be easily and reliably accomplished.

In particular, the opening and closing plates 53 and 54 are provided so as to avoid the central section 52 that is the portion positioned directly below the upper tape 33. The leading end sides of the opening and closing plates 53 and 54 (the opposite sides to the swing shafts 55 and 56) accordingly do not interfere with the upper tape 33 when opened, and the leading end sides of the opening and closing plates 53 and 54 can be opened to the angle (FIG. 5) so as to be raised higher than the upper tape 33.

As a result, the temporary storage section 5 can achieve a sufficiently wide through path from outside into the internal space 30A, while protecting the thin film material upper tape 33 from being cut by contact with the movable guide 41.

In the temporary storage section 5, upwards reaction force imparted from the drum 31 is received by the base plate 51 as the opening and closing plates 53 and 54 are provided in the movable guide 41 further to the rear than the contact portion 41T with the drum 31. The opening and closing plates 53 and 54 are therefore not opened unintentionally as such reaction force is not transmitted from the drum 31 to the opening and closing plates 53 and 54.

The opening and closing plates 53 and 54 can also be held in a closed state by the springs internally installed in the swing shafts 55 and 56. The opening and closing plates 53 and 54 can also be returned to the closed state under the action of restoration force of the springs in cases when, during a transaction operation, the opening and closing plates 53 and 54 temporarily open as the banknotes BL that have been wound on the drum 31 swell the outer diameter of the drum 31 due for example to creasing or folding and contact and impart upward force on the opening and closing plates 53 and 54

The temporary storage section 5 can accordingly ensure that the banknotes BL are pressed against the outer peripheral face of the drum 31 without scattering torn notes of the banknotes BL accumulated in the internal space 30A around the inside of the automated teller machine 1.

In the temporary storage section 5, the opening and closing plates 53 and 54 are provided to the movable guide 41 rather than the partitioning wall of the temporary storage section casing 30. Accordingly, there is no problem in the temporary storage section 5 of interference with the various gear mechanisms inside the partitioning wall or structural members such as pillars required to maintain strength. Sufficiently large opening surface area can accordingly be secured.

According to the above configuration, in the temporary storage section 5 of the automated teller machine 1, the opening and closing plates 53 and 54 are connected through the swing shafts 55 and 56 to the rear side of the base plate 51 in the movable guide 41. Accordingly during a transaction operation with the automated teller machine 1, the banknotes BL can be pressed against the outer peripheral face of the drum 31 by the movable guide 41 as a whole by closing the opening and closing plates 53 and 54. However, during a maintenance operation, the internal space 30A can be directly viewed and easily accessed from outside by opening the opening and closing plates 53 and 54. The automated teller machine 1 can accordingly achieve a significantly higher ease of operation during maintenance operations than previously.

4. Other Exemplary Embodiments

In the exemplary embodiment described above, an example has been given in which the swing shafts 55 and 56 are provided in the movable guide 41 at the front side of the opening and closing plates 53 and 54, namely between the opening and closing plates 53 and 54 and the base plate 51.

Figure 7:
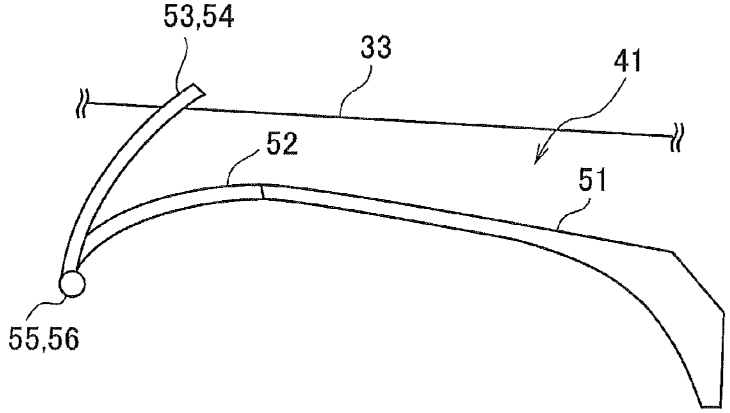
FIG. 7 is an outline drawing illustrating a movable guide configuration (1) according to another exemplary embodiment.
Figure 8:
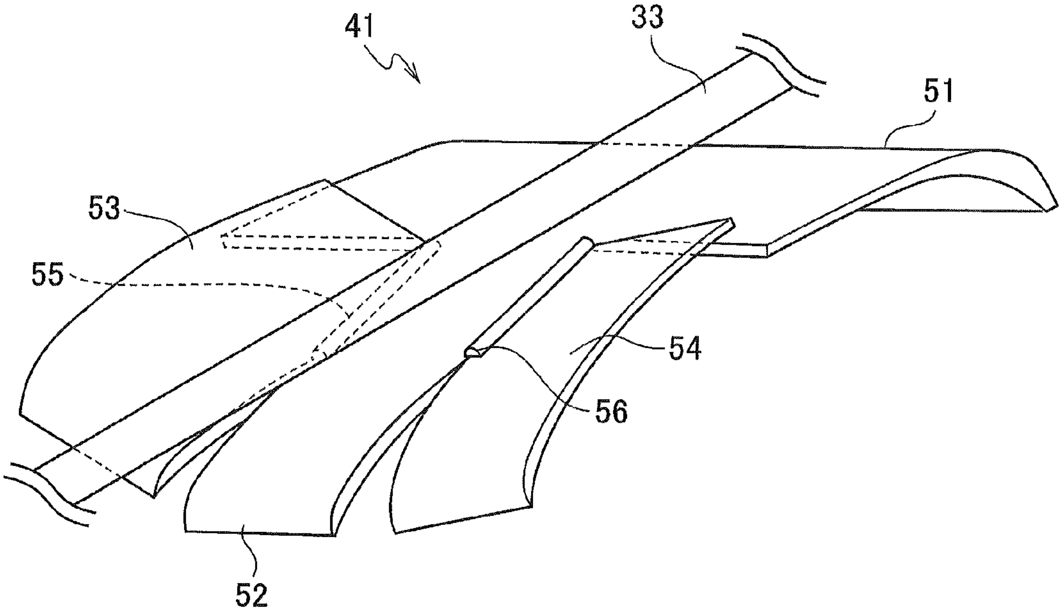
FIG. 8 is an outline perspective view illustrating a movable guide configuration (2) according to another exemplary embodiment.
Figure 9:
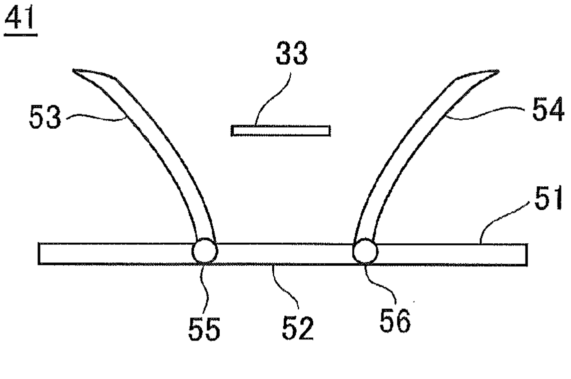
FIG. 9 is an outline drawing illustrating a movable guide configuration (3) according to another exemplary embodiment.
Figure 10:
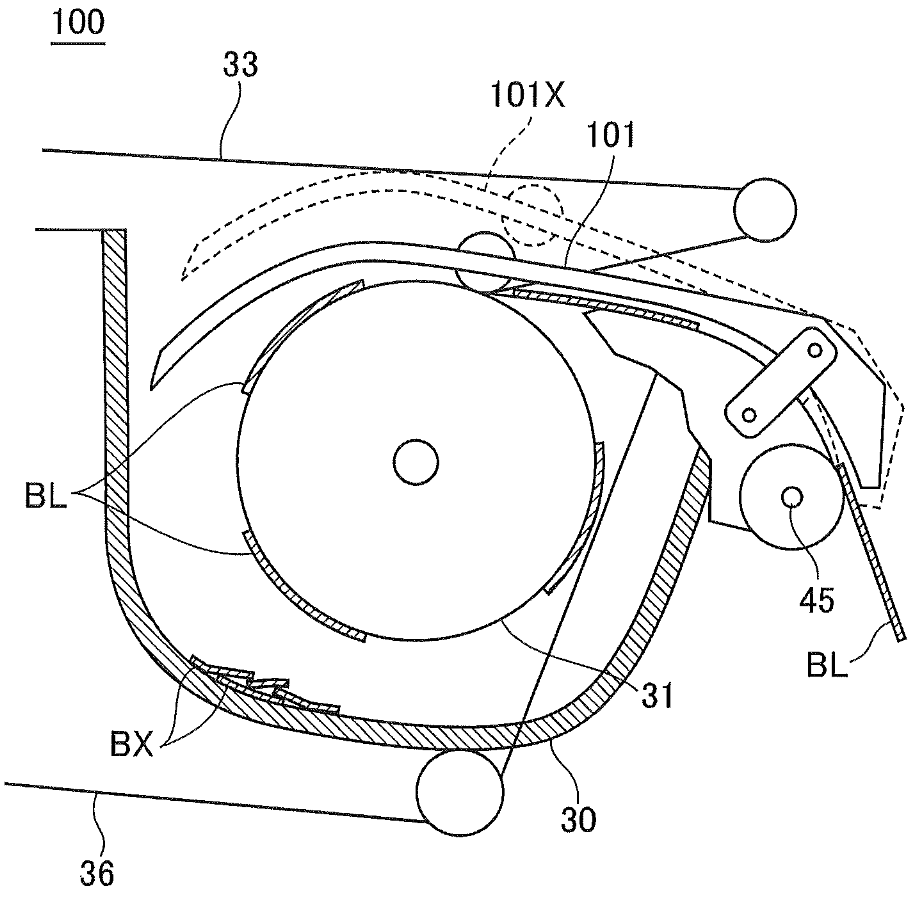
FIG. 10 is an outline drawing illustrating an internal configuration of a related temporary storage section.

However the present invention is not limited thereto and configuration may be made as shown in FIG. 7 with the swing shafts 55 and 56 provided at the rear sides of the opening and closing plates 53 and 54, or as shown in FIG. 8 and FIG. 9, provided with the swing shafts 55 and 56 running along the front-rear direction between the opening and closing plates 53 and 54 and the central section 52. Further, the swing shafts 55 and 56 may be provided at different locations to each other at the opening and closing plates 53 and 54.

In the above exemplary embodiment, configuration is made such that the closed state and the open state of the movable guide 41 are achieved by swinging the opening and closing plates 53 and 54 about the swing shafts 55 and 56.

However the present invention is not limited thereto and configuration may be made such that the closed state and the open state are achieved by the opening and closing plates 53 and 54 being moved horizontally or rotated so as to be superimposed on the base plate 51 using for example a known sliding mechanism or rotation mechanism.

In the above exemplary embodiment, an example is given in which the length of the opening and closing plates 53 and 54 in the front-rear direction is about ⅓ the length of the movable guide 41 in the front-rear direction.

The present invention is not limited thereto and the length of the opening and closing plates 53 and 54 in the front-rear direction may be configured as any suitable length, such as about ½ or about ¼ the length of the movable guide 41. The length of the opening and closing plates 53 and 54 may be configured shorter in the front-rear direction or in another direction such as the left-right direction than the movable guide 41. When such an approach is adopted, while the surface area of the opening becomes narrower, the danger of interference between the opening and closing plates 53 and 54 and other components can be reduced, and the opening and closing operation of the opening and closing plates 53 and 54 can be simplified.

In the above exemplary embodiment, an example is given of a case in which the opening and closing plates 53 and 54 in the movable guide 41 are biased in the closing direction V2 (FIG. 5) by springs internally installed in the swing shafts 55 and 56, such that the opening and closing plates 53 and 54 are held in the closed state when no external force is being imparted.

However the present invention is not limited thereto and configuration may be made such that small protrusions are provided on the side face of the central section 52 such that the opening and closing plates 53 and 54 are held in a closed state by the opening and closing plates 53 and 54 engaging with such protrusions. The opening and closing plates 53 and 54 may be configured to be held in the closed state under the action of gravity alone.

In the above exemplary embodiment, an example is given of a case in which both the opening and closing plates 53 and 54 in the movable guide 41 are capable of opening and closing.

However the present invention is not limited thereto and only one of the opening and closing plates 53 and 54 is provided, and the other of the opening and closing plates 53 and 54 is replaced with a portion integrated to the base plate 51 such that it is not capable of opening or closing.

In the above exemplary embodiment, an example is given of a case in which the swing shafts 55 and 56 provided in the movable guide 41 further to the rear than the contact portion 41T.

However the present invention is not limited thereto and the swing shafts 55 and 56 may be provided further forwards than the contact portion 41T. In such cases, biasing force of the spring internally installed in the swing shafts 55 and 56 may be increased, such that the opening and closing plates 53 and 54 do not open unintentionally due to force imparted from the drum 31.

In the above exemplary embodiment, an example is given of a case in which, in the movable guide 41, the swing angle of the opening and closing plates 53 and 54 with respect to the base plate 51 is fixed when the opening and closing plates 53 and 54 are in a closed state, as shown by the solid lines in FIG. 5.

However the present invention is not limited thereto and swing shafts may be provided along the left-right direction between the base plate 51 and the central section 52, such that the central section 52 can swing with respect to the base plate 51. The leading end side (rear side) of the central section 52 then swings to follow the outer periphery of the drum 31 in response to variation in the outer diameter of the drum 31 that is wound with banknotes BL, and the swing angle of the opening and closing plates 53 and 54 then also varies interlocked to an swing amount of the central section 52.

In the above exemplary embodiment, an example is given of a case in which the opening 30B is provided at the top side of the temporary storage section casing 30, and the movable section 40 is disposed further towards the top side than the drum 31, with gravity employed to press the movable guide 41 of the movable section 40 against the outer peripheral face of the drum 31.

However the present invention is not limited thereto and the opening 30B may be provided on the front side, rear side or bottom side of the temporary storage section casing 30, and the movable section 40 disposed on the drum 31 front side, rear side or bottom side so as to cover of opening 30B, and a biasing member such as a spring employed to press the movable guide 41 of the movable section 40 against the outer peripheral face of the drum 31.

In the above exemplary embodiment, an example is given of a case in which only a single pair of upper tape 33 and lower tape 36 is provided in the temporary storage section 5, and in which the opening and closing plates 53 and 54 are provided at locations such that the opening and closing plates 53 and 54 do not interfere with the upper tape 33 when open.

However the present invention is not limited thereto and two or more pairs of the upper tape 33 and the lower tape 36 may be provided to the temporary storage section 5, and the opening and closing plates 53 and 54 may be provided at locations such that the opening and closing plates 53 and 54 do not interfere with any of the upper tapes 33 when open. Opening and closing sections may also be provided to three or more locations in such cases.

In the above exemplary embodiment, an example is given of a case in which the present invention is applied to the temporary storage section 5 of the automated teller machine 1.

However the present invention may be provided to various devices in which banknotes BL are sandwiched between an upper tape 33 and lower tape 36, wound on a drum 31 and temporarily stored, such as for example to a device for checking denomination or counting banknotes.

In the above exemplary embodiment, in the temporary storage section 5, the banknotes BL are wound on the outer peripheral face of the drum 31 with the banknotes BL in a retained state between the upper tape 33 and the lower tape 36.

However the present invention is not limited thereto and the lower tape 36 and mechanisms related to the lower tape 36 may be omitted from the temporary storage section 5, the face of the upper tape 33 that contacts the banknotes BL made adhesive, and the banknotes BL temporarily held by the upper tape 33 using this adhesiveness, with the upper tape 33 wound on the outer peripheral face of the drum 31 so as to be superimposed on the surface of the banknotes BL.

In the above exemplary embodiment, the temporary storage section 5 of the automated teller machine 1 is provided for performing money transactions, and banknotes BL serve as a medium wound on the drum 31 sandwiched between the upper tape 33 and the lower tape 36, so as to be stored.

However the present invention is not limited thereto and the present invention may be applied to various apparatuses that store a thin paper shaped medium, such as a product voucher, money voucher, or ticket on a drum 31. In such cases, such factors as width and number of tapes for the upper tape 33 and the lower tape 36 may be appropriately determined according to the size and shape of the particular medium.

In the above exemplary embodiment, the temporary storage section 5 is configured as a medium processing apparatus including: the temporary storage section casing 30 serving as a casing; the upper reel 32 serving as a reel; the upper guide roller 34 serving as a fold-back section; the drum 31 serving as a drum; the movable guide 41 serving as a winding guide; and the opening and closing plates 53 and 54 serving as opening and closing sections.

However the present invention is not limited thereto and a medium processing apparatus may be configured by various other configurations for the casing, the reel, the fold-back section, the drum, the winding guide and the opening and closing section.

INDUSTRIAL APPLICABILITY

The present invention can be employed in various apparatuses for temporarily storing an introduced paper-shaped medium such as a banknote by retaining between two tapes and winding onto a drum.

What is claimed is:

1. A medium processing apparatus, comprising:

a casing configuring an internal space surrounded by a partitioning wall with an opening formed in the casing where there is no partitioning wall present;

a reel disposed on a first side of the casing, and on which tape is wound, with the tape width being narrower than a long side of a rectangular shaped medium;

a fold-back section provided on a second side, of the casing, that is opposite from the first side with the opening being disposed between the reel and the fold-back section, such that the tape pulled out from the reel passes across the opening and is folded back by the fold-back section;

a drum formed in a circular cylindrical shape provided in the internal space so as to be rotatable with respect to the casing, such that a rectangular shaped medium fed in from outside the casing in landscape orientation is wound onto the drum together with the tape that has been folded back on itself by the fold-back section;

a winding guide provided farther to a drum side than the tape spanning across between the reel and the fold-back section, such that the winding guide closes off the internal space from the outside of the casing and presses the tape and the medium against a peripheral face of the drum; and an opening and closing section configuring a portion of the winding guide and opening the internal space to the outside of the casing or closing off the internal space from the outside of the casing.

2. The medium processing apparatus of claim 1, wherein the opening and closing section is provided at a location of the winding guide such that the opening and closing section does not interfere with the tape spanning between the reel and the fold-back section when the opening and closing section opens the internal space to the outside of the casing.

3. The medium processing apparatus of claim 1 wherein:

the winding guide contacts the drum at a portion of a face of the winding guide that faces towards the drum; and the opening and closing section is provided at a location of the winding guide that does not contact the drum.

4. The medium processing apparatus of claim 1 wherein:

the length of a side of the opening and closing section in a specific direction is shorter than the winding guide in the specific direction.

5. The medium processing apparatus of claim 1 further comprising a biasing section that biases the opening and closing section towards a closed position closing off the internal space from the outside of the casing.

6. The medium processing apparatus of claim 1, wherein the opening and closing section swings with respect to the winding guide about an opening and closing section swing shaft provided substantially parallel to a rotation axis of the drum.

7. The medium processing apparatus of claim 6 wherein:

the winding guide comprises a winding guide swing shaft provided in the vicinity of a feed opening through which the medium is fed in from outside, with the winding guide swing shaft substantially parallel to the drum rotation axis; and the opening and closing section is provided with the opening and closing section swing shaft at the winding guide swing shaft side of the opening and closing section.

* * * * *